Dec. 28, 1926.
R. Q. GOLDTHREAD
INNER TUBE
Filed April 5, 1926
1,612,575
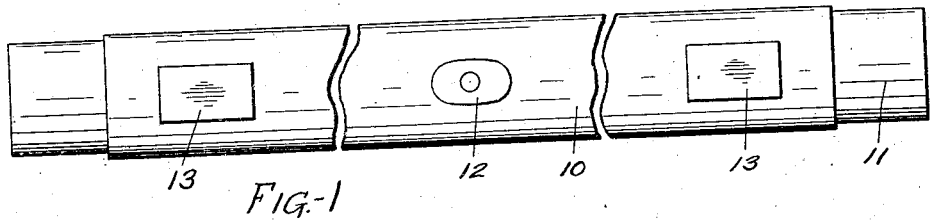
FIG.-1
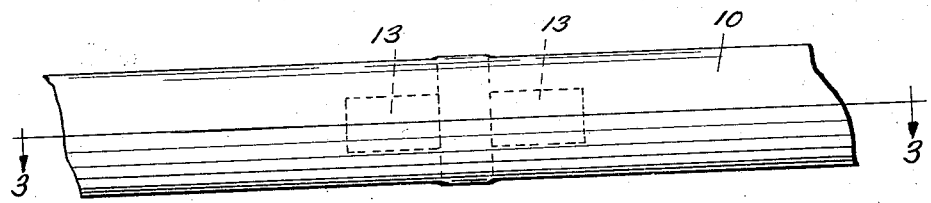
FIG.-2
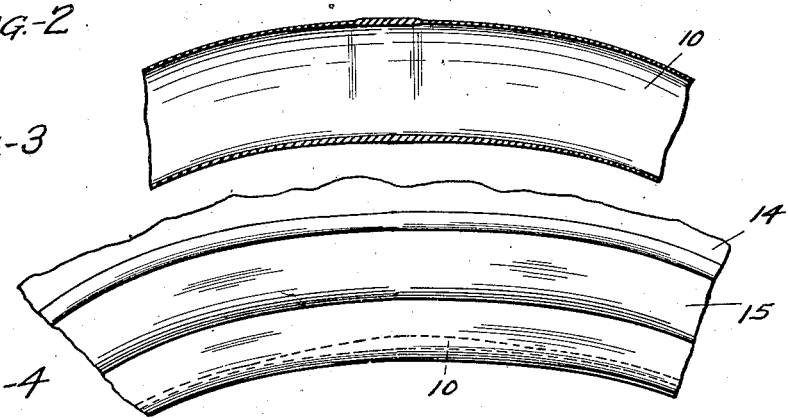
FIG.-3
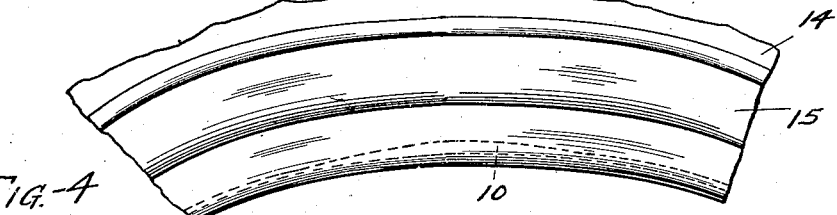
FIG.-4
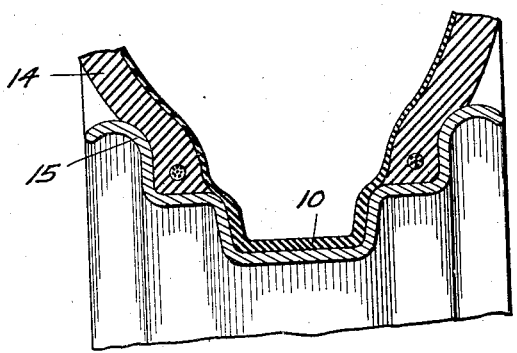
FIG.-5
INVENTOR.
ROBERT Q. GOLDTHREAD
BY 
ATTORNEY.

Patented Dec. 28, 1926.

1,612,575

UNITED STATES PATENT OFFICE.

ROBERT Q. GOLDTHREAD, OF AKRON, OHIO, ASSIGNOR TO THE FIRESTONE TIRE AND RUBBER COMPANY, OF AKRON, OHIO, A CORPORATION OF OHIO.

INNER TUBE.

Application filed April 5, 1926. Serial No. 99,757.

This invention relates to inner tubes for pneumatic tires.

In the manufacture of inner tubes of rubber for pneumatic tires, it is customary first to form an open ended tube either by wrapping a sheet of rubber on a pole or mandrel or by die expressing or "tubing" and cutting it to length to form an open-ended tube. The ends of tubes are then buffed, cemented, and inserted one within the other to form a splice which is usually cured under heat and pressure to form the completed annular tube.

Tubes made as described above have therein a narrow splice of substantially double the thickness of the remainder of the tube. This double thickness splice is a serious disadvantage when a tube cured in circular form in cross-section, which is the usual form, is confined in an irregular space by the pneumatic tire casing and the rim.

For instance, when employed in tires on drop center rims, the thicker splice portion, being stiffer than the remainder of the tube, tends to bridge the "well" of the rim and will not be effectively seated therein under the inflation pressure. This results in the wall of the tube adjacent the splice to be subjected to undue strain and to "balloon out," forming nipples of unduly stretched rubber adjacent the splice which weaken and soon puncture in service.

The present invention has for its object the forming of a tube wherein the inflation pressure is distributed over a large area of substantially equal thickness to the splice and gradually tapering to the normal thickness of the tube wall, whereby the tube can be effectively expanded into an irregular space such as the "well" of a drop center rim without "ballooning out" and forming the nipples which cause early failure thereof.

The foregoing and other objects are obtained by the tube illustrated and described in the accompanying drawings. It is to be understood that the invention is not limited to the specific form thereof shown and described.

Of the accompanying drawings:

Figure 1 is a view illustrating a formed, non-vulcanized tube on the mandrel on which it is vulcanized and showing sheets of rubber attached thereto so as to provide a thicker wall on the inside of the completed tube adjacent the splice;

Figure 2 illustrates the inner periphery of a tube spliced after vulcanization of the tube, the position of the thickened wall portion adjacent the splice resulting from vulcanizing, the sheets therein being indicated by dotted lines;

Figure 3 is a circumferential section through a completed tube at the splice on the line 3—3 of Figure 2;

Figure 4 is a part side elevation of a tire mounted on a drop center rim and illustrating the tube therein at the splice in dotted lines; and Figure 5 is a part radial section thereof.

Referring to the drawings, 10 represents a rolled or tubed inner tube of unvulcanized rubber on a mandrel 11, here shown as straight but which may be of the "circular" type. In preparing the tube for vulcanization, a valve patch 12 is applied as will be understood. If the tube is to be used on a drop center rim, there are applied to the tube in alignment with patch 12, circumferentially extending sheets 13, 13 of vulcanizable rubber of the same thickness as the wall of the tube and spaced from the ends of the tube a distance equal to the width of the splice to be made therein. The tube is then vulcanized under pressure, such as the helical wrapper of fabric commonly employed. This provides a tube which, when spliced, (see Figure 2), is formed with inner wall portions of double thickness on opposite sides of the splice and gradually merging at their edges, due to the flowing of the sheet rubber under heat and pressure, into the normal wall thickness of the remainder of the tube. The splice is cured in the usual manner.

When mounted within a casing 14 on a drop center rim 15, and inflated, the inflation pressure will be effective on the comparatively large area of the thick-walled portion of the tube adjacent the splice and will expand the tube so that it will snugly fit into the "well" of the rim (Figures 4 and 5) without "ballooning out" any portion thereof.

Modifications of the invention may be resorted to without departing from the spirit thereof or the scope of the appended claims.

What is claimed is:

1. An inner tube for pneumatic tires, said tube having the standard splice of substantially double the thickness of the tube wall therein, the portions of the wall of the inner periphery of said tube adjacent said splice and extending circumferentially away from the splice on both sides thereof being of a thickness substantially equal to the thickness of the splice, said portions gradually tapering away from the splice to the thickness of the remainder of the tube.

2. An inner tube for pneumatic tires, said tube having the standard splice of substantially double the thickness of the tube wall therein, the portions of the wall of the inner periphery of said tube adjacent said splice and extending circumferentially away from the splice on both sides thereof being of a thickness substantially equal to the thickness of the splice.

3. An inner tube adapted to be expanded under inflation pressure from the transverse cross-sectional shape in which it is vulcanized into an irregular cross-sectional shape, said tube having the standard splice therein of substantially double the wall thickness of the remainder of the tube and having circumferentially extending portions of the tube adjacent the portion of the splice which is to assume the irregular shape substantially equal in wall thickness to the thickness of the splice whereby the splice may be effectively expanded into the irregular shape.

ROBERT Q. GOLDTHREAD.